(12) United States Patent
Yi

(10) Patent No.: US 8,308,377 B2
(45) Date of Patent: Nov. 13, 2012

(54) DELATCH DEVICE HAVING BOTH PUSH AND PULL OPERABILITY FOR USE WITH AN OPTICAL TRANSCEIVER MODULE, AND A METHOD

(75) Inventor: Robert Yi, San Jose, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 195 days.

(21) Appl. No.: 12/844,442

(22) Filed: Jul. 27, 2010

(65) Prior Publication Data

US 2012/0027362 A1 Feb. 2, 2012

(51) Int. Cl.
*G02B 6/36* (2006.01)
*G02B 6/00* (2006.01)

(52) U.S. Cl. .................. 385/92; 385/53; 385/134
(58) Field of Classification Search .............. 385/53, 385/92, 134
See application file for complete search history.

(56) References Cited

U.S. PATENT DOCUMENTS

| | | | |
|---|---|---|---|
| 5,666,272 A | 9/1997 | Moore et al. | |
| 6,149,465 A * | 11/2000 | Berg et al. | 439/630 |
| 6,335,869 B1 * | 1/2002 | Branch et al. | 361/816 |
| 6,491,446 B1 | 12/2002 | Kryzak | |
| 6,556,445 B2 * | 4/2003 | Medina | 361/728 |
| 6,570,768 B2 * | 5/2003 | Medina | 361/747 |
| 6,685,363 B2 | 2/2004 | Kryzak | |
| 6,746,158 B2 * | 6/2004 | Merrick | 385/53 |
| 6,786,653 B1 | 9/2004 | Hwang et al. | |
| 6,994,478 B1 | 2/2006 | Chiu et al. | |
| 7,008,248 B2 | 3/2006 | Kondas et al. | |
| 7,147,502 B1 * | 12/2006 | Wu | 439/352 |
| 7,204,712 B2 * | 4/2007 | Schwiebert et al. | 439/352 |
| 7,215,554 B2 * | 5/2007 | Torres et al. | 361/747 |
| 7,238,040 B1 * | 7/2007 | Wu | 439/352 |
| 7,281,862 B2 | 10/2007 | Oen et al. | |
| 7,281,937 B2 * | 10/2007 | Reed et al. | 439/352 |
| 7,307,847 B2 * | 12/2007 | Torres et al. | 361/730 |
| 7,354,292 B1 | 4/2008 | Lloyd et al. | |
| 7,402,070 B1 | 7/2008 | Wu | |
| 7,416,353 B2 * | 8/2008 | Yoshikawa et al. | 385/92 |
| 7,445,389 B2 | 11/2008 | Aronson | |
| 7,473,124 B1 | 1/2009 | Briant | |
| 7,513,698 B2 | 4/2009 | Andersson | |

(Continued)

FOREIGN PATENT DOCUMENTS

CN 101499821 8/2009

(Continued)

OTHER PUBLICATIONS

Reflex Photonics, Inc., , "QSFP (Quad Small Form-factor Pluggable)", *InterBOARD Active Optical Cable* 2005.

(Continued)

*Primary Examiner* — Rhonda Peace

(57) ABSTRACT

An optical transceiver module is provided with a delatch device that is configured for pushing and pulling an optical transceiver module into and out of a cage. The delatch device includes an elongated handle having at least one strength member integrally formed therein or secured thereto that provides the handle with a sufficient moment of inertia to prevent the handle from bending or buckling when a force is being applied to the elongated handle to push an optical transceiver module into a cage. The elongated handle allows a module to easily be inserted into a cage by a user without the user having to directly access the front face of the module.

10 Claims, 4 Drawing Sheets

U.S. PATENT DOCUMENTS

| | | | |
|---|---|---|---|
| 7,566,226 B2 | 7/2009 | Roemer et al. | |
| 7,690,939 B2 * | 4/2010 | Wu | 439/352 |
| 7,736,171 B2 * | 6/2010 | Reed et al. | 439/352 |
| 7,771,225 B1 * | 8/2010 | Wu | 439/352 |
| 7,841,887 B2 * | 11/2010 | Zhang et al. | 439/352 |
| 8,030,570 B2 | 10/2011 | Seraj et al. | |
| 2002/0167793 A1 * | 11/2002 | Branch et al. | 361/686 |
| 2003/0142917 A1 * | 7/2003 | Merrick | 385/53 |
| 2006/0252311 A1 * | 11/2006 | Togami et al. | 439/607 |
| 2006/0258201 A1 * | 11/2006 | Schwiebert et al. | 439/352 |
| 2009/0188106 A1 | 7/2009 | Wang et al. | |
| 2009/0227133 A1 * | 9/2009 | Zhang et al. | 439/160 |
| 2009/0290619 A1 | 11/2009 | Flens et al. | |
| 2009/0291578 A1 * | 11/2009 | Wu | 439/258 |
| 2010/0246142 A1 | 9/2010 | Phillips | |
| 2011/0080008 A1 | 4/2011 | Teo | |
| 2011/0267742 A1 * | 11/2011 | Togami et al. | 361/679.01 |
| 2012/0027362 A1 | 2/2012 | Yi | |

FOREIGN PATENT DOCUMENTS

| | | |
|---|---|---|
| EP | 2 290 417 | 3/2011 |

OTHER PUBLICATIONS

Zarlink Semiconductor, Inc.,, "ZL60620 ZLynx QSFP Optical Cable (4+4)×5 Gbps Data Sheet", Mar. 2009, 2 pages.

* cited by examiner

DELATCH DEVICE HAVING BOTH PUSH AND PULL OPERABILITY FOR USE WITH AN OPTICAL TRANSCEIVER MODULE, AND A METHOD

TECHNICAL FIELD OF THE INVENTION

The invention relates to optical transceiver modules. More particularly, the invention relates to a delatch device that has both push and pull latching and delatching operability for use with an optical transceiver module.

BACKGROUND OF THE INVENTION

State-of-the-art digital communication switches, servers, and routers currently use multiple rows of duplex LC connector optical transceivers to meet information bandwidth and physical density needs. To be a commercially fungible product, the optical transceivers must have basic dimensions and mechanical functionality that conform to an industry standard Multi-Source Agreement (MSA) such as set forth in the Small Form Factor (SFF) committee's INF-8074i "SFP Transceiver" document. Many optical transceiver mechanical designs that comply with and add value beyond the basic mechanical functionally set forth in the MSA are possible.

FIG. 1 illustrates a standard configuration for a system 100 including an optical transceiver module 110 having a conventional delatch mechanism and a cage 120. Optical transceiver module 110 contains a transceiver that converts optical data signals received via an optical fiber (not shown) into electrical signals for an electrical switch (not shown) and converts electrical data signals from the switch into optical data signals for transmission. Cage 120 would typically be part of the switch and may be mounted in closely spaced rows above and below a printed circuit board.

When plugging module 110 into a switch, an operator slides module 110 into cage 120 until a post 114 on module 110 engages and lifts a latch tab 122 on cage 120. Module 110 then continues sliding into cage 120 until post 114 is even with a hole 124 in latch tab 122 at which point latch tab 122 springs down to latch module 110 in place with post 114 residing in hole 124. Post 114 is shaped such that an outward force on module 110 does not easily remove module 110 from cage 120. Module 110 has a delatch mechanism 130, which resides in a channel extending away from post 114. In a latched position, delatch mechanism 130 is outside cage 120, and post 114 is in hole 124. To remove module 110, delatch mechanism 130 is slid toward cage 120 until wedges 132 on delatch mechanism 130 slide under and lift latch tab 122 to a level above post 114. Module 110 can then be slid out and removed from cage 120.

Operation of delatch mechanism 130 can be awkward since removal of module 110 requires pushing in on delatch mechanism 130 while pulling out module 110. Additionally, when module 110 is in an array of modules in an optical switch, modules above module 110 will often block easy access to delatch mechanism 130, making removal of module 110 more difficult. Surrounding modules also make each module more difficult to grip.

Other module delatch mechanisms have been developed in attempts to simplify the removal procedure. One such module has a flexible strip that is attached to the module and resides under the latch tab in the latched position. To delatch the module, an operator pulls up and out on the flexible strip, and the flexible strip lifts the latch tab off the post on the module. Releasing the latch tab and removing the module in this manner requires significant upward force. For many operators, the operation of this delatch mechanism is not intuitive since pulling directly out on the flexible tab will not release the module. Additionally, in a high-density configuration, surrounding modules can make the flexible tab difficult to grip.

Another "pull-to-detach" mechanism provides the module with a post on a lever arm and a flexible handle mounted to a rod. When the flexible handle is pulled, the rod forces the lever arm to rotate and lower the post away from the cage, releasing the module from the latch on the cage. The pulling force on the flexible handle then slides the module out of the cage. Return springs that hold the lever arm and the post in position are features molded into the plastic housing. This system requires an operator to apply a great deal of force to remove the module.

FIGS. 2A and 2B illustrate cutaway bottom perspective views of a known optical transceiver module 210 having a delatch mechanism 230 that does not require excessive force to extract from a cage 120 and that is easily accessible in high density module arrangements. The module 210 and the delatch mechanism 230 are disclosed in U.S. Pat. No. 6,746,158 by the assignee of the present application and is incorporated herein by reference in its entirety.

In FIG. 2A, the delatch mechanism 230 is in a latched configuration. In FIG. 2B, the delatch mechanism 230 is in a delatched configuration. Half of cage 120 is cut away in FIGS. 2A and 2B to better show module 210, and the delatch mechanism 230, and part of module 210 is also cut away to better illustrate the delatch mechanism 230. Cage 120 includes a latch tab 122 (half of which is shown in FIG. 2A) including a hole 124 that can accommodate a post 214. Although FIG. 2A illustrates cage 120 as being isolated, cage 120 would typically be one of several substantially identical cages arranged in a dense array of cages. The delatch mechanism 230 includes an integrated structure 240 and a bail 250. Integrated structure 240 includes features such as ridges 242 and 244, spring arms 246, and wedges 248. Bail 250 is friction fit through a hole in integrated structure 240 and can be flipped down as shown in FIG. 2A to keep the bail 250 out of the way, or flipped up as shown in FIG. 2B to extend out and facilitate pulling on delatch mechanism 230 during removal of module 210. Ridges 242 and 244 also provide grip points for pulling delatch mechanism 230 when bail 250 is down or is otherwise inconvenient for gripping. An LC fiber connector (not shown) can attach to module 210 through the center of bail 250.

The spring arms 246 have ends in notches 216 in module 210. (The cut away view of FIG. 2A shows only one of notches 216, the other notch being omitted to better illustrate integrated structure 240.) The spring arms 246 flex in response to a pulling force on delatch mechanism 230 and permit a limited range of motion for delatch mechanism 230 relative to module 210. In the latched configuration shown in FIG. 2A, spring arms 246 can be uncompressed or have some spring loading, and wedges 248 reside in pockets 212 in module 210. Above wedges 248 is latch tab 122, half of which is illustrated in FIG. 2A. Through latch tab 122 is hole 124, in which post 214 resides when module 210 is latched in cage 120.

To remove the module 210 from the cage 120, an operator pulls out on delatch mechanism 230 via bail 250 or ridges 242 and/or 244. Initial pulling bends/flexes spring arms 246 and slides wedges 248 out of their respective pockets 212. As wedges 248 rise out of pockets 212, wedges 248 push up on latch tab 122. In FIG. 2B, the spring arms 246 have reached a limit of their compression and wedges 248 have lifted latch tab 122 above post 214. The spring arms 246 are at angles such that pulling on integrated structure 240 flexes spring arms 246 about their respective bases and extends the ends of spring arms 246 further into notches 216 in module 210. Accordingly, pulling more firmly engages spring arms 246 in notches 216. In the illustrated configuration of FIG. 2B, spring arms 246 contact fixed portions 247 of delatch mechanism 230 and cannot flex further. The pulling force thus acts on module 210 to slide module 210 out of cage 120.

Although the delatch mechanism 230 works well with regard to delatching and removing the module 210 from the cage 120, the delatch mechanism 230 does not work well for inserting the module 210 into the cage 120 to place the module in the latched configuration. To insert the module 210 into the cage 120, a user typically uses a finger to either push on the ridges 242/244 or on the extended bail 250 until the module 210 is latched within the cage 120 in the configuration shown in FIG. 2A. The module 110 shown in FIG. 1 is inserted into the cage 120 in a similar manner, except that it does not have a bail that can be used for this purpose. Rather, a user pushes on the front face of the module 110 to push the module 110 into the cage 120. As indicated above with reference to FIGS. 2A and 2B, there are typically many such cages 120 and modules 210 arranged in a densely packed array. In such arrangements, it can be difficult for a user to push with a finger on these features of the module due to the closeness of the modules within the array, which can prevent the user from having the direct manual access to the modules that is needed to push them into the cages. Although the extended bail 250 of the module 210 shown in FIGS. 2A and 2B can be used to push the module 210 into the cage 120, the bail 250 does not have the rigidness needed for this purpose due to the fact that it has a degree of rotational freedom of movement. Also, the bail 250 is too short to be used very effectively for this purpose.

Accordingly, a need exists for a delatch device that has a configuration that enables a user to easily push an optical transceiver module into a cage and thereby cause the module to be placed in the latched configuration. A need also exists for such a delatch device that also enables a user to easily place the module in the delatched configuration and remove the module from the cage.

SUMMARY OF THE INVENTION

The invention is directed to a delatch device and method that enables a user to easily push an optical transceiver module into a cage without the user having to have direct manual access to the front face of the module in order to push the module into the cage. The delatch device comprises an elongated handle having a proximal end and a distal end, a module coupling mechanism disposed on an upper surface of the distal end of the handle, and a delatch mechanism disposed on a lower surface of the distal end of the elongated handle. The elongated handle has a substantially rigid structure and is of sufficient stiffness to prevent the elongated handle from buckling or bending if a user uses the proximal end of the handle to push an optical transceiver module coupled to the distal end of the handle into a cage to latch the module within the cage. The module coupling mechanism is configured to mechanically couple an optical transceiver module to the distal end of the elongated handle. The delatch mechanism is configured to latch with a latching feature of a cage in a latched position and to delatch from the latching feature of the cage in a delatched position.

The method comprises providing a delatch device comprising an elongated handle, positioning the distal end of the elongated handle having the optical transceiver module coupled therewith in an opening of a cage, and applying a force on the proximal end of the elongated handle in a direction substantially toward the cage opening to cause the distal end of the handle having the module coupled therewith to be pushed into the cage opening. The elongated handle has a substantially rigid structure and is of sufficient stiffness to prevent the handle from buckling or bending when the force is applied to the proximal end of the handle to push the module coupled to the distal end of the handle into the cage. When the module has been pushed a particular distance into the cage opening, the delatch mechanism latches with a latching feature of the cage in a latched position.

These and other features and advantages of the invention will become apparent from the following description, drawings and claims.

DETAILED DESCRIPTION OF AN ILLUSTRATIVE EMBODIMENT

In accordance with the invention, an optical transceiver module is provided with a delatch device that is configured for pushing and pulling an optical transceiver module into and out of a cage. The delatch device includes an elongated handle having at least one strength member integrally formed therein or secured thereto that provides the handle with a sufficient moment of inertia to prevent the handle from bending or buckling when the elongated handle is being used to push an optical transceiver module into a cage. The elongated handle allows a module to easily be inserted into a cage by a user without the user having to directly access the front face of the module. The delatch device will now be described with reference to a few illustrative embodiments in order to demonstrate the principles and concepts of the invention.

Figure 3A:
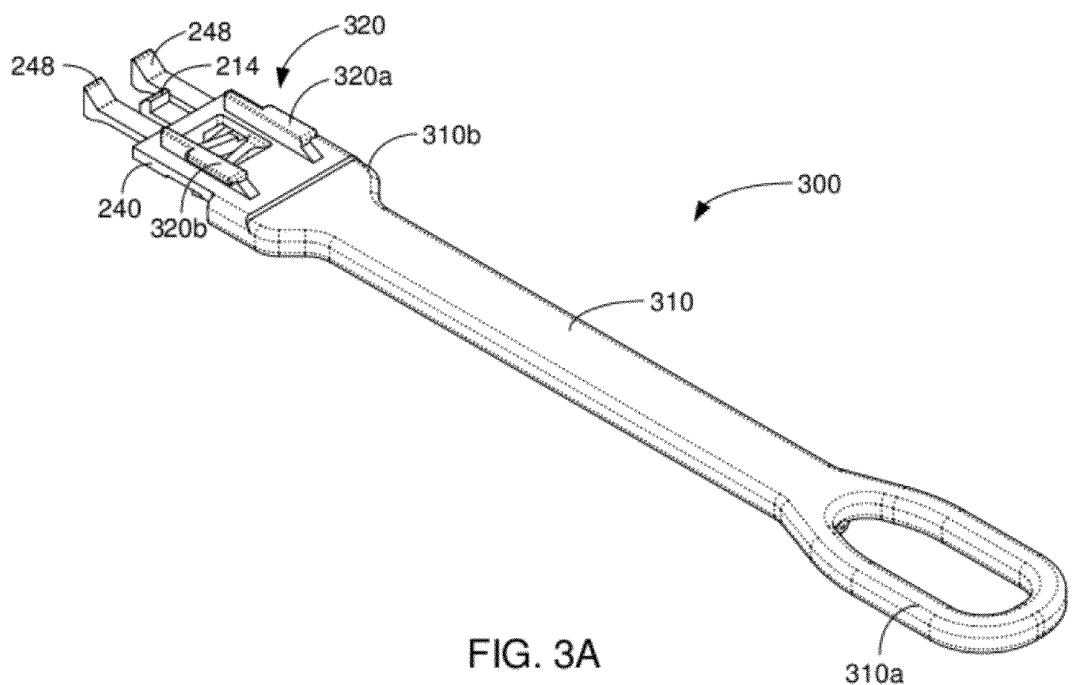
FIG. 3A illustrates a top perspective view of the delatch device in accordance with an illustrative embodiment.
Figure 3B:
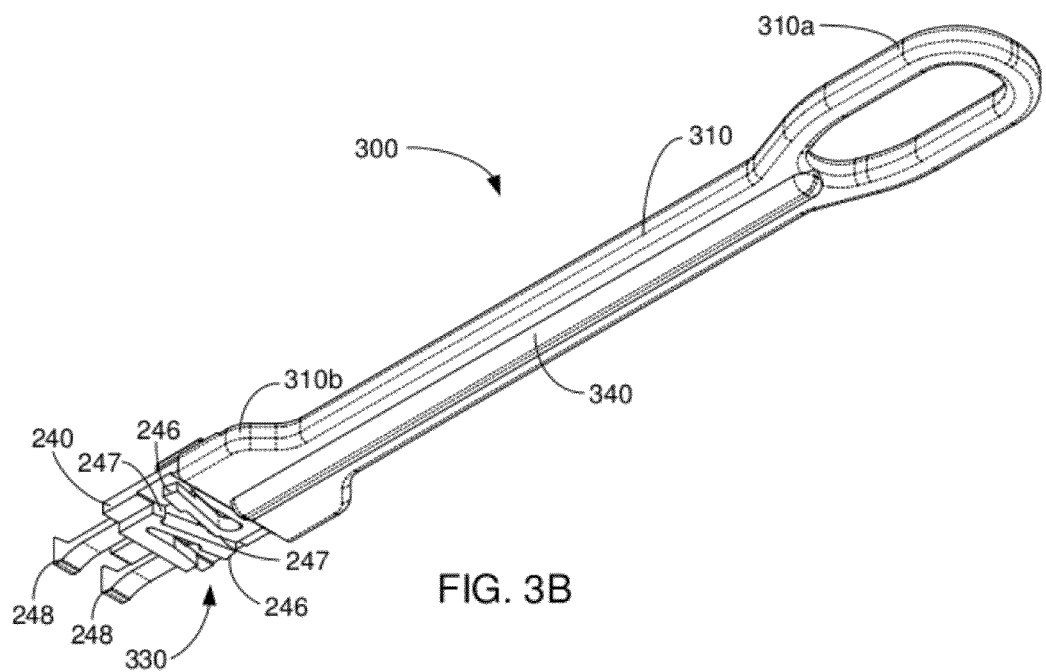
FIG. 3B illustrates a bottom perspective view of the delatch device shown in FIG. 3A.
Figure 3C:
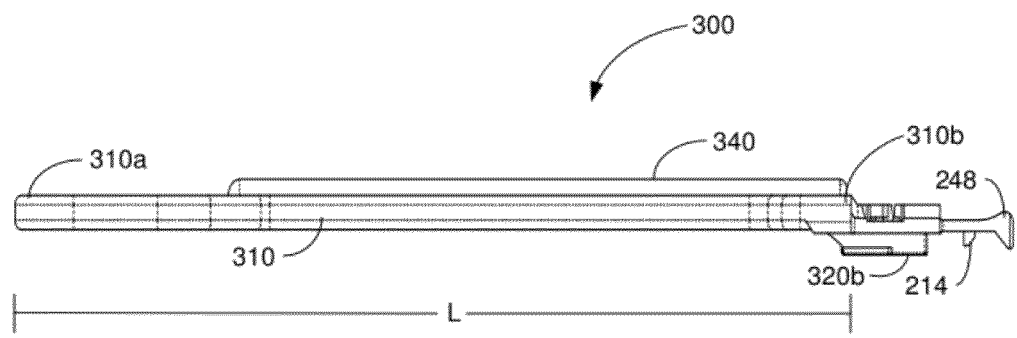
FIG. 3C illustrates a side view of the delatch device shown in FIGS. 3A and 3B.

FIGS. 3A-3C illustrate top perspective, bottom perspective and side views, respectively, of the delatch device 300 in accordance with an illustrative embodiment. The delatch device 300 includes an elongated handle 310, a module coupling mechanism 320, and a delatch mechanism 330. The elongated handle 310 has a proximal end 310a and a distal end 310b. The distal end 310b has the module coupling mechanism 320 and the delatch mechanism 330 disposed thereon. In accordance with this illustrative embodiment, the module coupling mechanism 320 includes two I-beams 320a and 320b that are spaced apart from each other and extend parallel to each other on the upper surface of the distal end 310b. As will be described below with reference to FIGS. 4A and 4B, the I-beams are configured to slidingly engage respective slots formed in an optical transceiver module housing. The I-beams 320a and 320b operate as strength members that add stiffness to the distal end 310b of the elongated handle 310 at the location where an optical transceiver module couples with the distal end 310b, as will be described below with reference to FIGS. 4A and 4B.

Figure 1:
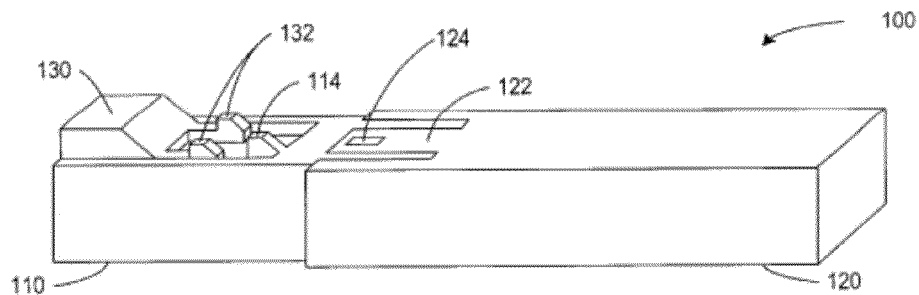
FIG. 1 illustrates a perspective view of a known optical transceiver module with a conventional delatch mechanism.
Figure 2A:
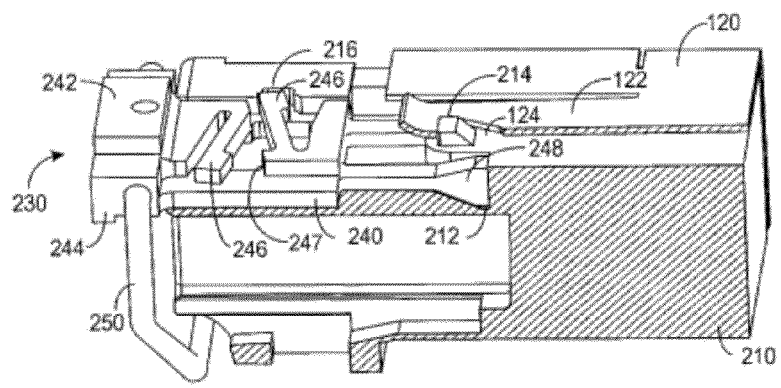
FIGS. 2A and 2B illustrate cut-away, perspective views of portions of a known optical transceiver module with a known delatch mechanism in latched and unlatched positions, respectively.
Figure 2B:
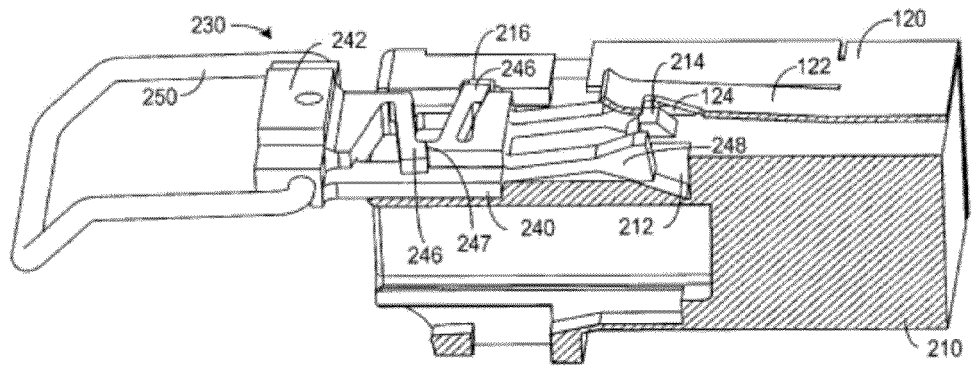

The delatch mechanism 330 is disposed on the lower surface of the distal end 310b of the elongated handle 310 opposite the upper surface of the distal end 310b on which the I-beams 320a and 320b are disposed. The delatch mechanism 330 is identical to the delatch mechanism 230 described above with reference to FIGS. 2A and 2B, and like numerals in FIGS. 2A-3C represent like elements or features. The delatch mechanism 330 operates in the same manner in which the delatch mechanism 230 operates, as described above with reference to FIGS. 2A and 2B. Therefore, in the interest if brevity, a detailed discussion of the operations of the delatch mechanism 330 will not be provided herein.

The elongated handle 310 provides a user with easy manual access to allow the delatch device 300 to be used to push or pull an optical transceiver module into or out of a cage. The elongated handle 310 obviates the need for a user to have direct manual access the front face or the bail of an optical transceiver module in order to insert or extract the module into or from the cage. The elongated handle 310 has a length, L, that is significantly longer than the length of the extended bail 250 shown in FIG. 2B. Typically, the length L of the elongated handle 310 ranges from about 15 millimeters (mm) to about 300 mm. Unlike the bail 250 shown in FIG. 2B, the elongated handle 310 does not rotate, but has the substantially rigid elongated configuration shown in FIGS. 3A-3C.

In accordance with this illustrative embodiment, a T-beam 340 extends generally from the proximal end 310a of the elongated handle 310 to the distal end 310b of the elongated handle 310. The T-beam 340 operates as a strength member that increases the moment of inertia of the delatch device 300 during the act of pushing an optical transceiver module into a cage. In other words, the T-beam 340 adds stiffness to the handle 310 to prevent the handle 310 from buckling or bending when a push force is exerted on the proximal end 310a of the handle 310 to push an optical transceiver module into a cage.

The delatch device 300 may have a unibody construction, i.e., made as a single piece part. Making the delatch device 300 as a single piece part will typically reduce manufacturing costs. It may, however, be desirable to make the delatch device 300 of multiple piece parts for certain applications, such as, for example, in applications that require a longer length for the elongated handle 310. The delatch device 300 is not limited with respect to the type of material of which it is made. The delatch device 300 may be made of, for example, polycarbonate, sheet metal, and a wide range of different plastic materials.

Figure 4A:
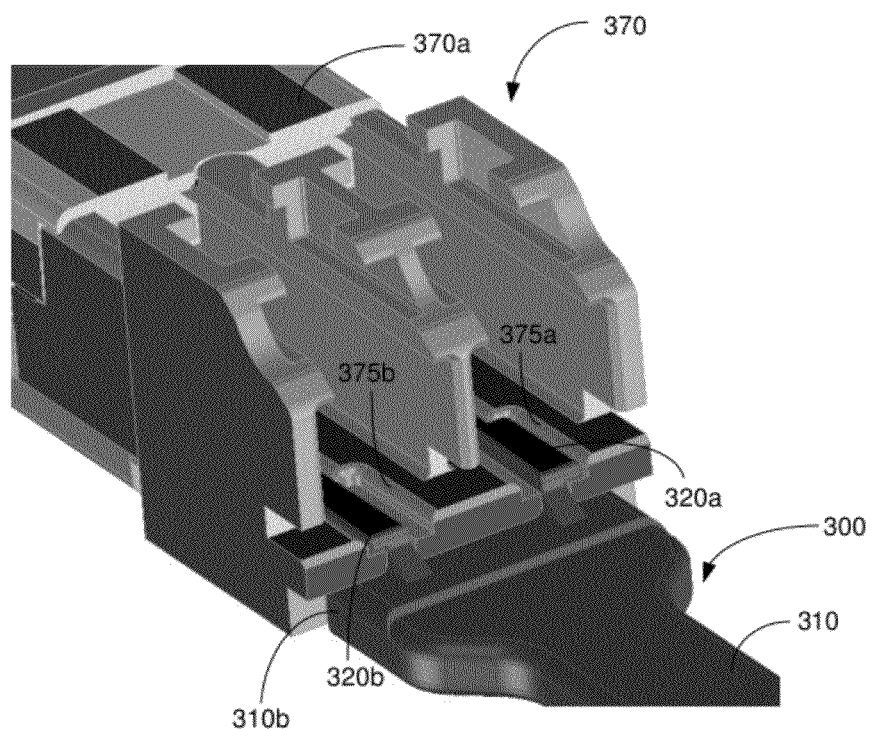
FIG. 4A illustrate top perspective view of the delatch device shown in FIGS. 3A-3C having an optical transceiver module coupled to the distal end thereof.
Figure 4B:
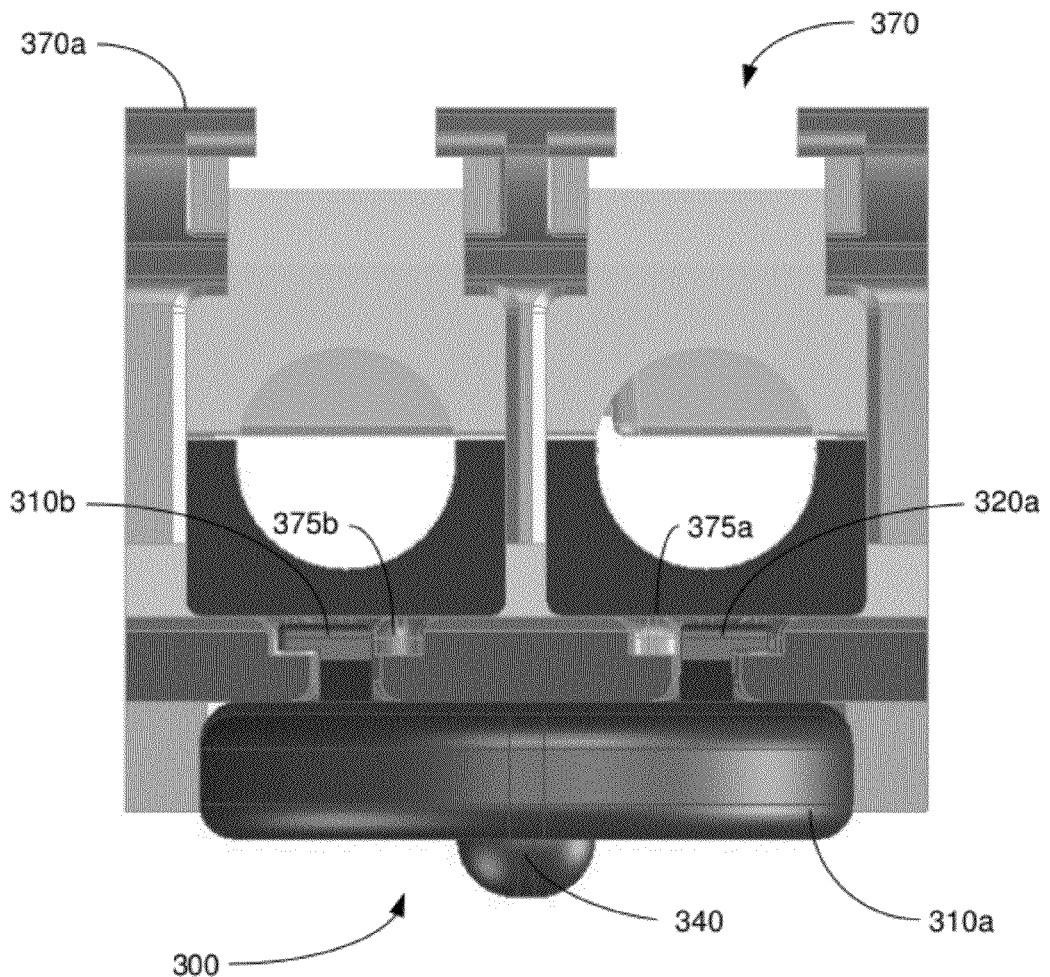
FIG. 4B illustrate a plan view from a proximal end of the delatch device shown in FIG. 4A having the optical transceiver module coupled to the distal end thereof.

FIGS. 4A and 4B illustrate top perspective and proximal-end plan views, respectively, of the delatch device 300 having an optical transceiver module 370 coupled with the module coupling mechanism 320 of the delatch device 300. The housing 370a of the optical transceiver module 370 has slots 375a and 375b formed therein that are shaped and sized to mate with the I-beams 320a and 320b, respectively, of the module coupling mechanism 320. Once mated, the I-beams 320a and 320b are in sliding engagement with the slots 375a and 375b, respectively. The I-beams 320a and 320b provide the distal end 310b of the handle 310 with additional stiffness at the location at which the module 370 couples with the handle 310. Together, the I-beams 320a and 320b and the T-beam 340 provide the delatch device 300 with sufficient stiffness and stability to enable it to be used to push the optical transceiver module 370 into the cage to place the module 370 in the latched configuration described above with reference to FIG. 2A.

It should be noted, however, that modifications may be made to the delatch device 300 without deviating from the scope of the invention. Any elongated configuration of the delatch device 300 that provides it with sufficient stiffness to prevent bending or buckling while also facilitating a user to push and pull an optical transceiver module into and out of a cage is a suitable configuration. For example, the delatch device 300 may operate suitably even if the T-beam 340 is eliminated from the handle 310 because the I-beams 320a and 320b may provide the delatch device 300 with sufficient stiffness. Alternatively, the delatch device 300 may operate suitably without the I-beams 320a and 320b because the T-beam 340 may provide the delatch device 300 with sufficient stiffness. As yet another alternative, a single I-beam that extends from the proximal end 310a to the distal end 310b of the handle 310 could be used to couple an optical transceiver module to the distal end 310b of the handle 310 and to provide the delatch device 300 with the stiffness needed to prevent the handle 310 from bending or buckling during a push action. Persons skilled in the art will understand the manner in which these and other modifications may be made to the delatch device 300, and that all such modifications are within the scope of the invention.

It should be noted that the term "optical transceiver module" is used herein to describe any of the following: (1) a module that has both transmit and receive capability for transmitting and receiving optical signals over an optical waveguide; (2) a module that has transmit, but not receive, capability for transmitting optical signals over an optical waveguide; and (3) a module that has receive, but not transmit, capability for receiving optical signals over an optical waveguide.

It should be noted that the invention has been described with reference to a few illustrative embodiments for the purposes of demonstrating the principles and concepts of the invention. For example, delatch mechanisms other than the delatch mechanism 330 may be used to latch and delatch an optical transceiver module to and from a cage. A variety of delatch mechanisms are known that are suitable for this purpose. In addition, delatch mechanism that are developed in the future may also be used for this purpose. The delatch device 300 is not limited to incorporating any particular delatch mechanism for this purpose. As indicated above, many modifications may be made to the embodiments described herein without deviating from the scope of the invention.

What is claimed is:

1. A delatch device for use in an optical transceiver module, the delatch device comprising:

an elongated handle having a proximal end and a distal end, the elongated handle having a substantially rigid structure and being of sufficient stiffness to prevent the handle from buckling or bending if a user uses the proximal end of the handle to push an optical transceiver module coupled to the distal end of the handle into a cage to latch the module within the cage;

a module coupling mechanism disposed on an upper surface of the distal end of the handle, the module coupling mechanism being configured to mechanically couple an optical transceiver module to the distal end of the elongated handle, the module coupling mechanism including at least one I-beam that operates as a strength member to provide the elongated handle with the sufficient stiffness to prevent the handle from buckling or bending, and wherein said at least one I-beam is configured to mate with a slot formed in a housing of an optical transceiver module such that the I-beam is in sliding engagement with the slot to thereby mechanically couple the optical transceiver module to the distal end of the elongated handle; and a delatch mechanism disposed on a lower surface of the distal end of the elongated handle, the delatch mechanism being configured to latch with a latching feature of a cage in a latched position and to delatch from the latching feature of the cage in a delatched position.

2. The delatch device of claim 1, further comprising:
at least one additional strength member comprising at least a beam that extends from the proximal end to the distal end of the elongated handle.

3. The delatch device of claim 1, further comprising at least a second I-beam, the second I-beam being part of the module coupling mechanism, and wherein the second I-beam is configured to mate with a second slot formed in the housing of the optical transceiver module such that the second I-beam is in sliding engagement with the second slot to thereby mechanically couple the optical transceiver module to the distal end of the elongated handle.

4. A delatch device for use in an optical transceiver module, the delatch device comprising:
an elongated handle having a proximal end and a distal end, the elongated handle having a substantially rigid structure and being of sufficient stiffness to prevent the handle from buckling or bending if a user uses the proximal end of the handle to push an optical transceiver module coupled to the distal end of the handle into a cage to latch the module within the cage;

a module coupling mechanism disposed on an upper surface of the distal end of the handle, the module coupling mechanism at least first and second I-beams, and wherein the first and second I-beams are configured to mate with first and second slots, respectively, formed in a housing of an optical transceiver module such that the first and second I-beams are in sliding engagement with the first and second slots, respectively, to thereby mechanically couple the optical transceiver module to the distal end of the elongated handle; and a delatch mechanism disposed on a lower surface of the distal end of the elongated handle, the delatch mechanism being configured to latch with a latching feature of a cage in a latched position and to delatch from the latching feature of the cage in a delatched position.

5. The delatch device of claim 4, wherein the I-beams also act as strength members to provide the delatch device with additional stiffness.

6. The delatch device of claim 5, further comprising a beam that extends from the proximal end to the distal end of the elongated handle, wherein the beam that extends from the proximal end to the distal end provides the elongated handle with stiffness that prevents bending or buckling of the elongated handle.

7. A method for latching an optical transceiver module in a cage, the method comprising:
providing a delatch device comprising an elongated handle, a module coupling mechanism, and a delatch mechanism, the elongated handle having a substantially rigid structure and being of sufficient stiffness to prevent the handle from buckling or bending if a user uses the proximal end of the handle to push an optical transceiver module coupled to the distal end of the handle into a cage to latch the module within the cage, the module coupling mechanism being disposed on an upper surface of the distal end of the handle and having an optical transceiver module coupled therewith, the delatch mechanism being disposed on a lower surface of the distal end of the elongated handle, the module coupling mechanism including at least one I-beam that operates as a strength member to provide the elongated handle with the sufficient stiffness to prevent the handle from buckling or bending, and wherein said at least one I-beam is configured to mate with a slot formed in a housing of an optical transceiver module such that the I-beam is in sliding engagement with the slot to thereby mechanically couple the optical transceiver module to the distal end of the elongated handle;

positioning the distal end of the elongated handle having the optical transceiver module coupled therewith in an opening of a cage, the cage opening being configured to receive the optical transceiver module; and applying a force on the proximal end of the elongated handle in a direction substantially toward the cage opening to cause the distal end of the handle having the module coupled therewith to be pushed into the cage opening, wherein when the module is pushed a particular distance into the cage opening, the delatch mechanism latches with a latching feature of the cage in a latched position.

8. The method of claim 7, wherein the elongated handled further comprises a beam that extends from the proximal end to the distal end of the elongated handle, wherein the beam that extends from the promixal end to the elongated handle operates as an additional strength member to provide the elongated handle with additional stiffness to prevent the handle from buckling or bending.

9. The method of claim 7, wherein the module coupling mechanism further includes at least a second I-beam, and wherein the second I-beam is configured to mate with a second slot formed in the housing of the optical transceiver module such that the second I-beam is in sliding engagement with the second slot to thereby mechanically couple the optical transceiver module to the distal end of the elongated handle.

10. A delatch device for use in an optical transceiver module, the delatch device comprising:
an elongated handle having a proximal end and a distal end;
a module coupling mechanism disposed on an upper surface of the distal end of the handle, the module coupling mechanism being configured to mechanically couple an optical transceiver module to the distal end of the elongated handle;
a delatch mechanism disposed on a lower surface of the distal end of the elongated handle, the delatch mechanism being configured to latch with a latching feature of a cage in a latched position and to delatch from the latching feature of the cage in a delatched position; and
a strength member comprising at least a beam that extends from the proximal end to the distal end of the elongated handle and at least a first I-beam that is part of the module coupling mechanism, and wherein the first I-beam is configured to mate with a first slot formed in a housing of an optical transceiver module such that the first I-beam is in sliding engagement with the first slot to thereby mechanically couple the optical transceiver module to the distal end of the elongated handle, wherein the beam that extends from the proximal end to the distal end of the elongated handle and the first I-beam provide the elongated handle with the sufficient stiffness to prevent the handle from buckling or bending if a user uses the proximal end of the handle to push an optical transceiver module coupled to the distal end of the handle into a cage to latch the module within the cage.

* * * * *